United States Patent [19]

Nagano

[11] Patent Number: 4,687,919
[45] Date of Patent: Aug. 18, 1987

[54] A LIGHTING CONTROL DEVICE IN MANUSCRIPT REPRODUCTION EQUIPMENT

[75] Inventor: Fumikazu Nagano, Yamatokoriyama, Japan

[73] Assignee: Sharp Kabushiki Kaisha, Osaka, Japan

[21] Appl. No.: 696,343

[22] Filed: Jan. 30, 1985

[30] Foreign Application Priority Data

Feb. 1, 1984 [JP] Japan ................................. 59-17844

[51] Int. Cl.$^4$ ............................................. G01J 1/32
[52] U.S. Cl. ..................................... 250/205; 315/151
[58] Field of Search ....................... 250/200, 201, 205; 355/35, 68, 69; 315/149, 151

[56] References Cited

U.S. PATENT DOCUMENTS 4,555,621 11/1985 Buchar ............................... 250/205

Primary Examiner—Eugene R. Laroche
Assistant Examiner—David Mis
Attorney, Agent, or Firm—Birch, Stewart, Kolasch, & Birch

[57] ABSTRACT

A lighting intensity control device that controls light intensity in a manuscript reproduction apparatus includes a back plate which has a manuscript area on which a manuscript can be disposed and a monitor area outside the manuscript area; a source of light which illuminates the manuscript and the monitor area of the back plate; a photodetector arranged so as to detect the brightness of the light reflected by the manuscript and by the monitor area of the back plate; and a light control element which controls the lighting time of the source of light during each scan period so as to keep the brightness of the light reflected by the monitor area of the back plate within a predetermined range.

11 Claims, 7 Drawing Figures

A LIGHTING CONTROL DEVICE IN MANUSCRIPT REPRODUCTION EQUIPMENT

FIELD OF THE INVENTION

This invention relates to a lighting control equipment which can be used in order to control the lighting by means of a source of light in apparatuses such as half-tone facsimile, a color copier, an optical character reader (OCR) and a color scanner wherein a character, a figure or an image can be read out automatically.

DESCRIPTION OF PRIOR ART

FIG. 1 shows an optical system used for read-out in apparatuses such as a half-tone facsimile, a color copier, an optical character reader, and a color scanner wherein the optical signal of a character, a figure or an image can be read out automatically. A manuscript 2, placed between a back plate 1 and a carrier plate 3, is exposed with a light emitted from a fluorescent light 5 through a transparent window 4 of the carrier plate 3. Both back plate 1 and transparent window 4 extend over the manuscript 2 linearly in a direction perpendicular to the carriage direction A of a manuscript 2. The light having been reflected by the manuscript 2 is reflected by a mirror 6, passes through a focusing lens 7 and is detected with a photodetector, that is, a one-dimensional charge-coupled device (hereinafter refered to as CCD) 8. Each element of the CCD 8 transmits an electrical signal proportional to the intensity of the incident light to an output device such as a printer (not shown).

In a prior art optical system mentioned above, if the intensity of the lighting of the fluorescent light 5 changes due to variations of the voltage applied thereto or to variations of the temperature thereof during a time needed to detect the brightness of a whole manuscript, the outputs of the CCD 8 are greatly affected in accordance with changes in light intensity. The output of an image may become irregular between the first and last parts of the image or over the entire image, thereby deteriorating the quality of a print of the image.

SUMMARY OF THE INVENTION

Accordingly, it is an object of the present invention to provide a new lighting control equipment which prevents the irregularity of the brightness due to the change in light intensity of the source of light.

A lighting control equipment according to the present invention comprises:

a back plate which has a manuscript area on which a manuscript can be applied and a monitor area outside the manuscript area;

a source of light which illuminates the manuscript and said monitor area of the back plate;

a photodetector means arranged so as to detect the brightness of the manuscript and said monitor area of the back plate;

a light control means which controls the lighting time of said source of light in each scan period so as to keep the brightness of said monitor area of the back plate within a predetermined range.

It is an advantage of the present invention that the read-out of an image does not fluctuate even if the light intensity of the source of light changes in a time needed for the read-out of an image. This prevents the brightness of the output of an image from becoming irregular thereby improving the performance of a read-out apparatus such as a facsimile.

DESCRIPTION OF THE PREFERRED EMBODIMENTS

Figure 1:
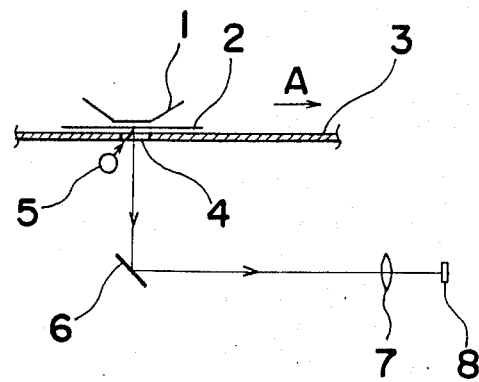
FIG. 1 shows a schematic cross-section of a prior-art optical system.
Figure 2:
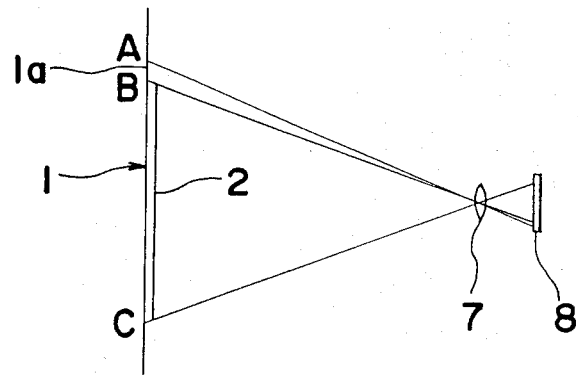
FIG. 2 shows a schematic cross-section of an optical system according to an embodiment of the present invention.

FIG. 2 shows an optical system for read-out of an image according to an embodiment of the present invention. A manuscript 2 is placed in front of a back plate 1, and the light from the manuscript 2 is projected through a lens 7 onto a one-dimensional CCD 8. As shown in FIG. 2, the optical system is so arranged that the light not only from manuscript area (BC) but also from a monitor area 1a (AB) of the back plate 1 is projected on the CCD 8. The CCD 8 has 2048 elements, and the light reflected from the white area AB is incident on the first to the 128-th elements of the CCD 8 while the light reflected from the manuscript AB is incident on the remaining elements of the CCD.

Figure 3:
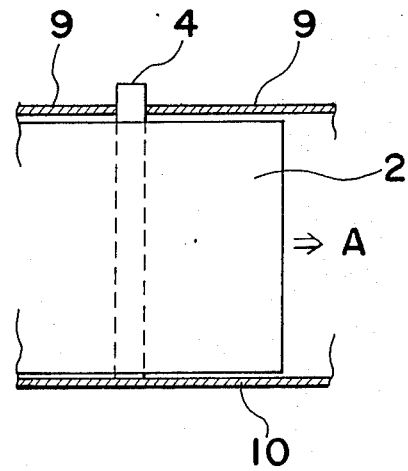
FIG. 3 show a schematic plan view of an optical system of an embodiment of the present invention.

FIG. 3 shows a top plan view of the optical system. A manuscript 2 is placed between a left carrier guide 9 and a right one 10, and is carried along the direction of the arrow A. Both back plate 1 and transparent window 4 are extended over the left carrier guide 9, and the manuscript 2 is prevented by the carrier guides 9, 10 from passing the monitor area 1a, that is, the extended area of the back plate 1. Then, the brightness of the monitor area 1a can be monitored constantly, through the transparent window 4, by the CCD 8.

The fluorescent light 5 is lit during an interval $T_{FL}$ per each scan period, and the lighting interval $T_{FL}$ is adjusted according to the detected brightness of the white monitor area 1a of the back plate 1. The light from the manuscript 2 and the white monitor area 1a is sensed by 2048 elements of the sensor part of the CCD 8 during $T_{FL}$, and then the detected video signals are transfered to the memory part of the CCD 8 and are read out from the memory part successively. The lighting interval $T_{FL}$ of the fluorescent light 5 is adjusted according to the video signal $V_1$ of the white monitor area 1a so as to keep the detected signal $V_1$ constant, as will be explained below.

Figure 4:
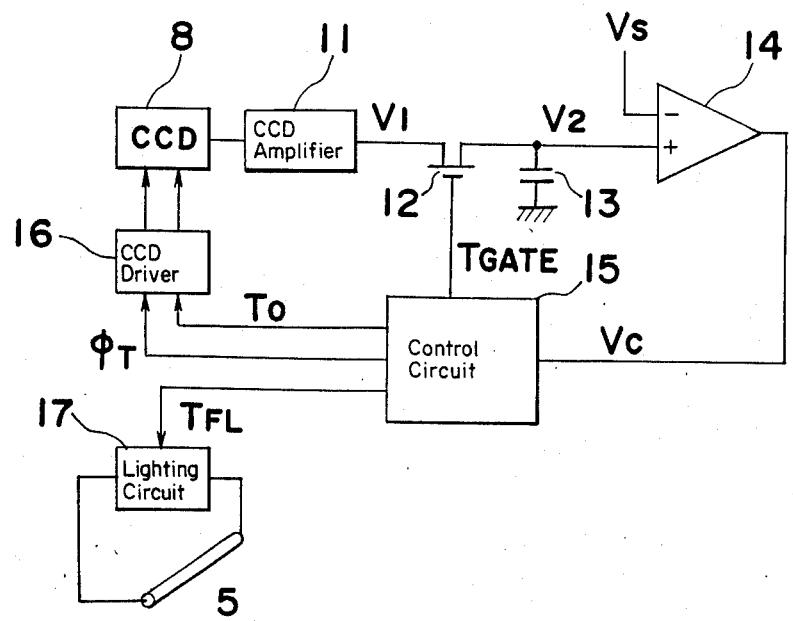
FIG. 4 shows a block diagram of a lighting control circuit.

FIG. 4 shows a lighting control circuit which controls the lighting time $T_{FL}$ of the fluorescent light 5 according to the detected video signal of the monitor area 1a. The detected video signals are successively amplified by a CCD amplifier 11. The amplified signal $V_1$ is applied through an analog switch 12 to the + input terminal of a comparator 14. A capacitor 13 is connected between the + input terminal and ground and averages the input signal $V_1$. The analog switch 12, for the sample-hold, is switched by a control circuit 15. The comparator 14 compares the input voltage $V_2$ at the + input terminal and the slice voltage $V_s$ applied to the − input terminal, and the output voltage $V_c$ is applied to an input terminal of a control circuit 15. The slice voltage $V_s$ is a predetermined voltage to be compared with $V_2$. The control circuit 15 gives a sample-hold signal $T_{GATE}$ to the analog switch 12. It also gives timing pulses $T_0$ and $\phi_T$ to the CCD 8 through a CCD driver 16 where $T_0$ is a fundamental pulse which can be used for the output of the video signal of each of the 2048 elements of the CCD 8 and $\phi_T$ is a pulse generated once per 4096 $T_0$ pulses at the start of each scan period. The control circuit 15 provides the interval $T_{FL}$, during which the fluorescent light 5 should be lit to a lighting circuit 17 of the fluorescent light 5.

Figure 5:
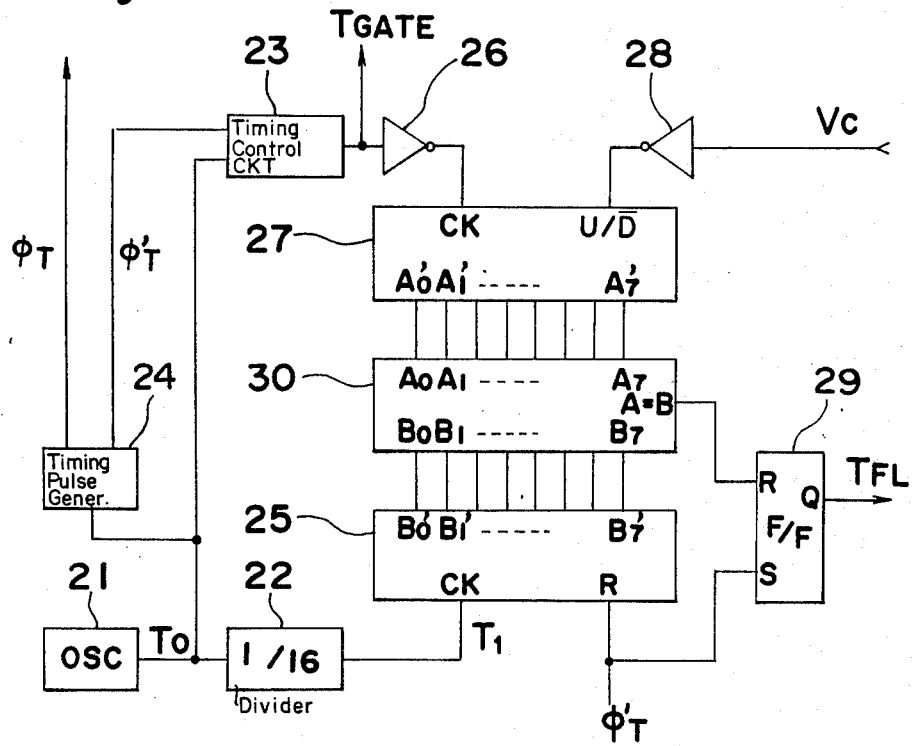
FIG. 5 shows a block diagram of the control circuit shown in FIG. 4.

FIG. 5 shows a circuit diagram of the control circuit 15. An oscillator 21 gives clock pulses $T_0$ to a 1/16 divider 22, a timing control circuit 23 and a timing pulse generator 24. The timing pulse generator 24 generates pulses $\phi_T$ and $\phi'_T$ per 4906 $T_0$ pulses, and applies them to the CCD driver 16 and to the timing control circuit 23, respectively. After a pulse $\phi_T$ is generated the video signals of the 2048 elements of the CCD 8 are all read out, as will be explained later. The output $T_1$ of the 1/16 divider 22 is connected to the count input, CK, of an up counter 25, while the output of the timing control circuit 23 is connected both to the analog switch 12 and through an inverter 26 to the count input CK of an up/down counter 27. The output $T_{GATE}$ makes the video signal $V_1$ pass through the analog switch 13, during a scan of the white monitor area 1a for example between the 49-th and 80-th element of the CCD 8. The output of the comparator 14 is connected through an inverter 28 to the up/down count input terminal V/$\overline{D}$ of the up/down counter 27. According to whether the input voltage $V_2$ is larger or smaller than $V_s$, the up/down counter 27 counts down or up at the negative edge of $T_{GATE}$. The pulse $\phi'_T$ is applied to the reset terminal R of the up counter 25, and to the set terminal S of a flip flop 29. The 8-bit output terminals $A'_0$, $A'_1$, ..., $A'_7$ of the up/down counter 27 and the 8-bit output terminals $B'_0$, $B'_1$, ..., $B'_7$ of the counter 25 are connected to the input terminals $A_0$, $A_1$, ..., $A_7$ and $B_0$, $B_1$, ..., $B_7$ of a digital comparator 30, respectively. The A=B output terminal of the digital comparator 30 is connected to the reset terminal R of the flip flop 29. The output terminal Q of the flip flop 29 gives a pulse $T_{FL}$ to the lighting circuit 17, and the fluorescent light 5 is lit when $T_{FL}=1$. The lighting time of the fluorescent light 5, that is, the period when $T_{FL}=1$, is equal to $n \times \Delta T$ where n is an integer, and $\Delta T = 16 \times t_0$ where $t_0$ is the period of the count up pulse $T_1$. The lighting time of the fluorescent light can be controlled by units of $\Delta T$ in the circuit shown in FIG. 4.

Figure 6:
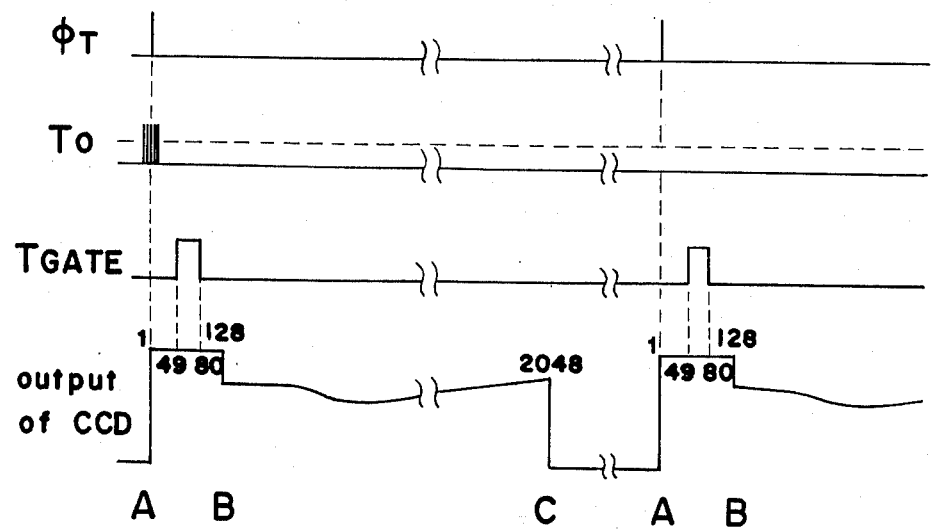
FIG. 6 shows a timing chart of signals $\phi_T$, $T_0$, $T_{GATE}$ and the output of CCD.

FIG. 6 shows a timing chart of $\phi_T$, $T_0$, $T_{GATE}$ and the output of CCD 8. The read-out of 2048 elements of CCD 8 is triggered by a pulse $\phi_T$. Then, the output of the video signal of each element is read out successively at each $T_0$ pulse. As mentioned above, the first to 128-th elements are arranged to correspond to the white monitor area 1a, and the video signal from the 129-th to 2048-th elements corresponds to a manuscript 2. A sample-hold pulse, $T_{GATE}$, becomes high and the analog switch 12 is switched on during a period corresponding to the 49-th to the 80-th elements. Then, the video signal $V_1$ is transmitted to the + input terminal of the comparator 14, and is held as $V_2$ at the negative edge of $T_{GATE}$. After all of the 2048 elements are read out, the CCD 8 is illuminated with the fluorescent light 5 after a pulse $\phi'_T$ during an adjusted time $T_{FL}$ which is made shorter or longer by $\Delta T$ according to whether the brightness ($V_2$) of the monitor area 1a is higher or lower than the predetermined reference brightness ($V_s$).

When electric power is turned on, the lighting time approaches to an appropriate value as follows. The output of the up/down counter 27 is 0 when electric power is turned on. Then, the up counter 25 is reset with a pulse $\phi'_T$, and the flip flop 29 is set with the same $\phi'_T$, and its signal at the output terminal Q becomes 1. Thus, the fluorescent light 5 is turned on. However, the output of the A=B terminal becomes 1 instantly so that $T_{FL}$ also becomes 0. Thus, the fluorescent light 5 lights only in a very short period. Next, the video signals of the CCD 8 are read out. Because the lighting time is very short, $V_2$ is smaller than $V_s$, and $V_c$ is 0. Then, the up/down counter 27 is counted up by one at the negative edge of $T_{GATE}$. Thus, the lighting time becomes $\Delta T$ in the following period. Similar processes are repeated till the brightness of the white monitor area 1a increases up to an appropriate value before a scan of a manuscript begins. After it attains an appropriate value, the lighting time can be adjusted, for example, as shown in FIG. 7.

Figure 7:
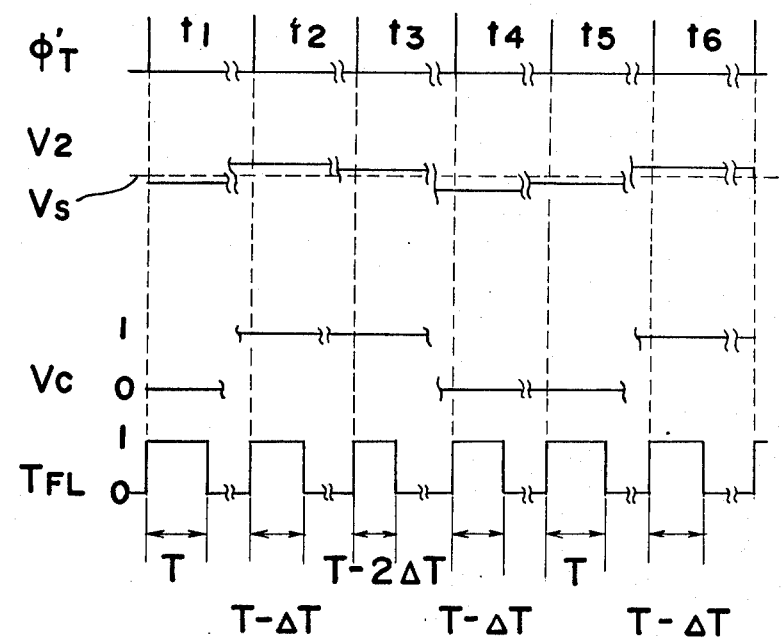
FIG. 7 shows a time chart of signals $v_2$, $V_c$ and $T_{FL}$.

FIG. 7 shows an example of the control of the lighting time of the fluorescent light 5. Each period $t_1$, $t_2$, ... begins with each $\phi'_T$ pulse. Then, the output $V_4$ of the comparator 14 becomes high or low depending upon whether $V_2$ is larger or smaller than the reference voltages $V_s$, and the lighting time is decreased or increased by $\Delta T$ from that of the last period depending upon whether the output $V_c$ of the comparator 14 is high or low. For example, in the period $t_2$, the white monitor area 1a is brighter than the reference brightness, that is, $V_2 > V_3$, and the lighting time is allowed to decrease by $\Delta T$ from the value T of the last period $t_1$. In the next period $t_3$, the white monitor area 1a is brighter again than the reference brightness, that is, $V_2 > V_3$, and the lighting time is allowed to decrease again by $\Delta T$ from the value $T-\Delta T$ of the last period $t_2$. In the next period $t_4$, the white monitor area 1a becomes less bright than the reference brightness, that is, $V_2 < V_3$, and the lighting time is allowed to increase by $\Delta T$ from the value $T-2\Delta T$ of the last period $t_3$. Similar processes are repeated. Thus, the fluctuation of the lighting intensity of the fluorescent light 5 integrated during a lighting time can be limited within a predetermined range by controlling the lighting time in accordance with the brightness of the white monitor area 1a detected by the CCD, and the fluctuation of the intensity can be controlled within a predetermined fluctuation range. Then, the integrated light intensity of the fluorescent light 5 incident on the manuscript can be kept constant, and the video signal of the manuscript then becomes uniform. In other words, the brightness of the white monitor area 1a of the back plate 1 is used to adjust the lighting time of the fluorescent light in order to get uniform output of the video signal of CCD. When the optical system mentioned above is used in the read-out equipment of such apparatuses as a color scanner, a facsimile, a color copier and an OCR, the fluctuation of the output of the read-out due to that of the lighting intensity of the fluorescent light decreases so that the brightness of a print can be kept uniform and the quality of a print can be improved.

This invention may be practiced or embodied in still other ways without departing from the spirit or essential character thereof. For instance, the brightness of the white monitor area 1a can be read-out at the end of each scan. Also, three sources of light, of three primary colors of red, green and blue, can be controlled in an optical system of apparatuses such as a color scanner and a color copier. The preferred embodiment described herein is therefore illustrative and not restrictive, the scope of the invention being indicated by the appended claims and all variations which come within the meaning of the claims are intended to be embraced therein.

I claim:

1. A lighting control device for compensating for changes in light intensity in a manuscript reproduction apparatus during a scanning period, comprising:
   a back plate having a manuscript area on which a manuscript can be applied and also having a monitor area distinct from the manuscript area;
   light means for illuminating the manuscript, applied to said manuscript area and said monitor area of said back plate during the scanning period;
   photodetector means for detecting a brightness of light from said manuscript and light from said monitor area, said photodetector means including a charge coupled device having a plurality of elements, a first group of said plurality of elements detecting said light from said manuscript and a second group of said plurality of elements detecting said light from said monitor area; and
   light control means for controlling a lighting time of said light means in the scanning period so as to keep the brightness of said light from said monitor area of the back plate, within a predetermined range.

2. The lighting control device of claim 1, wherein said monitor area is white.

3. The lighting control device of claim 1, wherein said source of light is a fluorescent light.

4. The lighting control device of claim 1, wherein said light control means comprises a comparator means which compares the brightness of said light from said monitor area and a predetermined reference brightness, and a timing control means which decreases or increases the lighting time by a predetermined difference according to whether the output of the comparator means shows that the brightness of said light from said monitor area is higher or lower than the reference brightness.

5. A lighting control device in a manuscript reproduction apparatus that controls a light that is used to illuminate a manuscript during a plurality of scanning periods in order to produce image signals and that compensates for changes in illumination intensity at the manuscript, comprising:
   a back plate having a manuscript area on which a manuscript can be disposed and having a monitor area, distinct from said manuscript area, said monitor area being illuminated by the lamp simultaneously with the manuscript, the light from said manuscript and light from said monitor area being produced upon illumination by the light during each scanning period;
   photodetector means for detecting said light from said manuscript and light from said monitor ara, said photodetector means including a charge coupled device having a plurality of elements, a first group of said plurality of elements detecting said light from said manuscript and a second group of said plurality of elements detecting said light from said monitor area; and
   light timing means for controlling a lighting time in each scanning period, said lighting time being a period of time during which the light is lit, said light timing means during a specific scanning period being responsive to the light from said monitor area detected in a scanning period immediately preceding said specific scanning period.

6. The lighting control device of claim 5 wherein said light timing means comprises:
   comparing means for comparing said light from said monitor area to a reference value, and producing a first output signal when said reference value exceeds said light from said monitor area or a second output signal when said light from said monitor area exceeds said reference value; and
   timing adjuster means, receiving an input signal constituting either said first or second output signal from said comparing means, for adjusting said lighting time in accordance with said input signal received to compensate for changes in illumination intensity of the light.

7. A lighting control device, in a manuscript reproduction apparatus, that controls a light that is used to illuminate a manuscript during a plurality of scanning periods in order to produce image signals, and that compensates for changes in illumination intensity of the light, comprising:
   a back plate having a manuscript area on which a manuscript can be disposed and having a monitor area, distinct from said manuscript area, said monitor area being illuminated by the light simultaneously with the manuscript, light from the manuscript and light from said monitor area being produced upon illumination by the light during each scanning period
   photodetector means for detecting said light from said manuscript and light from said monitor area and producing a video signal during each scanning period, said video signal having a monitor area component and a manuscript component; and
   light timing means for controlling a lighting time in each scanning period, said lighting time being a period of time during which the lamp is lit, said lighting means, during a given scanning period, being responsive to said monitor area component of said video signal produced in a scanning period immediately preceding said given scanning period.

8. The lighting control device of claim 7 wherein said photodetector means comprises a charge coupled device, said charge coupled device including a plurality of elements.

9. The lighting control device of claim 8 wherein a first group of said plurality of elements receives said light from said manuscript and a second group of said plurality of elements receives said light from said monitor area.

10. The lighting control device of claim 9 wherein said video signal is produced by successively reading out a condition of each of said plurality of elements of said charge coupled device and wherein said monitor area component is produced by successively reading out a condition of the elements of said second group of said plurality of elements and said manuscript component is produced by successively reading out a condition of the elements of said first group of said plurality of elements.

11. The lighting control device of claim 10 wherein said alight timing means comprises:
   comparing means for comparing said monitor area component to a reference value and producing an output signal indicative of the comparison; and
   timing adjuster means responsive to said output signal from said comparing means, for adjusting said lighting time in accordance with the outcome of the comparison to compensate for changes in illumination intensity of the light.

* * * * *